United States Patent Office 3,011,990
Patented Dec. 5, 1961

3,011,990
COMPOSITION CONTAINING POLYVINYL CHLORIDE, A DIBENZYL BENZENE COMPOUND AND A PLASTICIZER
Nikolaus Roh, Horst-Dieter Wulf, and Gerhard Weber, all of Marl, Kreis Recklinghausen, Germany, assignors to Chemische Werke Huls Aktiengesellschaft, Marl, Kreis Recklinghausen, Germany, a corporation of Germany
No Drawing. Filed Mar. 6, 1959, Ser. No. 797,559
Claims priority, application Germany May 7, 1958
2 Claims. (Cl. 260—31.8)

It is known that in general the liquid hydrocarbon fractions such as high boiling mineral oil and coal tar oil fractions cannot be used as plasticizing agents for vinyl chloride polymers because they are not sufficient compatible therewith in their gelling properties.

As so-called extenders or plasticizing diluents they can replace ordinary plasticizing agents such as the ester type plasticizers only partially. The addition of extenders reduced the viscosity of pastes of vinyl chloride polymers and plasticizing agents and thereby facilitates the handling and processing of such pastes. However, due to their dark color and their tendency to exudation, these extenders affect the properties of the fully gelled products.

It has been found that dibenzyl benzenes of the general formula

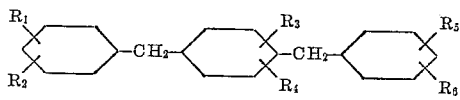

in which $R_1$ to $R_6$ each stands for a member of the group consisting of hydrogen, alkyl groups containing from 1 to 4 carbon atoms and aralkyl groups can be used to advantage as softening agents for polyvinylchloride.

It is recommended that the sum of the carbon atoms in the groups represented by $R_1$ to $R_6$ should not exceed 25, or preferably 20. Suitable dibenzyl benzene compounds for use in the invention are dibenzyl benzene itself and dibenzyl toluene, tribenzyl toluene, dixylyl xylene and their alkyl and aralkyl derivatives or mixtures of the above named compounds which are readily available and may be obtained as described in an application Serial No. 666,132, filed June 17, 1957, in the name of Horst-Dieter Wulf and Nikolaus Roh and assigned to the assignee of the present application, now Patent No. 2,954,412, issued Sept. 27, 1960.

The dibenzyl benzene compounds are used in quantities amounting to from 5% to 40% based upon the weight of the vinylchloride polymers. Within the range from 5% to 20% agglomerates are obtained which may be processed directly in screw moulding machines. At a dibenzyl benzene content of 20% to 40% the compositions of matter are plastic and easy to manipulate and can be processed in the warm or cold state. After gelation of these mixtures of polyvinyl chloride and dibenzyl benzenes products are obtained which correspond to rigid polyvinylchloride with respect to Shore hardness but have a materially better notched impact resistance and are free from the objectionable coloration which is produced by the hydrocarbon extenders.

It is especially advantageous to use mixtures of the dibenzyl benzenes with the customary plasticizing agents and particularly the so-called ester type plasticizers e. g. dialkyl phthalates. Their miscibility and compatibility is nearly unlimited. In general, mixtures ranging from 95 to 5 to from 60 to 40 parts of polyvinyl chloride to dibenzyl benzene compounds are used. In mixtures containing such customary plasticizers dibenzyl benzene compounds area as effective at temperatures up to 160° C. as the known extenders in that the viscosity of the pastes is reduced. However, contrary to the ordinary extenders they take part in gelation at temperatures above 160° C. so that they are firmly anchored in the completely gelled products and will not exude. In addition they confer to the polymers a superior Shore hardness and tensile strength.

The invention is illustrated by the following specific examples.

EXAMPLE 1

70 parts by weight of polyvinyl chloride are intimately mixed with 30 parts by weight of dibenzyl toluene. A kneadable composition of matter is thus obtained. Test specimens (4 x 6 x 50 mm.) made by compression moulding at 170° C. show a notched impact strength of 50 cm. kg./cm.$^2$ (rigid polyvinyl chloride 3-5). The Shore hardness is 97° (rigid polyvinyl chloride 95–100°).

EXAMPLE 2

Calendered sheets are made from 60 parts by weight of polyvinyl chloride and 40 parts by weight of dioctyl phthalate, the dioctyl phthalate is stepwise replaced up to one-half thereof by dixylyl xylene. Samples of these sheets are subjected under the same conditions to tests to determine their tear resistance, elongation, cold impact resistance and Shore hardness. The results are shown in the following table.

Table I

| | | | | | |
|---|---|---|---|---|---|
| Polyvinyl chloride | 60 | 60 | 60 | 60 | 60 |
| Dioctyl phthalate | 40 | 35 | 30 | 25 | 20 |
| Dixylyl xylene | | 5 | 10 | 15 | 20 |
| Tear resistance kg./cm.$^2$ | 169 | 175 | 183 | 197 | 204 |
| Elongation, percent | 371 | 367 | 360 | 354 | 342 |
| Cold impact resistance, ° C | −25 | −25 | −25 | −25 | −25 |
| Shore hardness | 70 | 72 | 73 | 77 | 80 |

As can be seen from the table both tear resistance and Shore hardness increase with an increasing content of dixylyl xylene.

EXAMPLE 3

In a paste mixture of 60 parts by weight of polyvinyl chloride and 40 parts by weight of dioctyl phthalate the dioctyl phthalate is replaced stepwise up to one-half thereof by a mixture of 80% of dibenzyl toluene and 20% of benzyl dibenzyl toluene. The viscosities of the resulting mixtures were determined and the results are shown in the following table.

Table 2

| Polyvinyl chloride | Dioctyl phthalate | Dibenzyl toluene and Benzyl dibenzyl toluene | Viscosity Poises at 25° C. |
|---|---|---|---|
| 60 | 40 | 0 | 40 |
| 60 | 35 | 5 | 29 |
| 60 | 30 | 10 | 26 |
| 60 | 25 | 15 | 24 |
| 60 | 20 | 20 | 20 |

As can be seen from the table the viscosity decreases as the content of the dibenzylbenzenes increases.

We claim:
1. A composition of matter comprising from 65% to 100% by weight of a homogenous mixture consisting of polyvinylchloride and a dibenzyl benzene compound of the formula

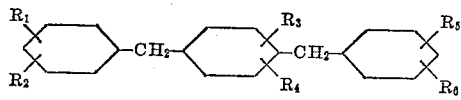

in which $R_1$ to $R_6$ each stands for a member of the group consisting of hydrogen, alkyl groups containing from 1 to 4 carbon atoms, and aralkyl groups, the total number of carbon atoms in said groups not exceeding 25, and from 0 to 35% by weight of a plasticizing agent for the polyvinylchloride, said dibenzyl benzene compound being present in quantities from 5% to 40% based upon the weight of the polyvinylchloride.

2. A composition of matter as defined in claim 1 in which the plasticizing agent is a dialkyl phthalate and constitutes from about 20% to about 35% by weight of the composition.

References Cited in the file of this patent

UNITED STATES PATENTS

| | | |
|---|---|---|
| 2,450,435 | McGillicuddy | Oct. 5, 1948 |
| 2,861,049 | Fuchs | Nov. 18, 1958 |
| 2,861,965 | Roncoroni | Nov. 25, 1958 |